United States Patent [19]

Stevens

[11] Patent Number: 4,734,636

[45] Date of Patent: Mar. 29, 1988

[54] RESONANT SWITCHING REGULATOR

[76] Inventor: Carlile R. Stevens, 468 El Rio Rd., Danville, Calif. 94526

[21] Appl. No.: 779,133

[22] Filed: Sep. 23, 1985

[51] Int. Cl.⁴ .............................................. G05F 1/44
[52] U.S. Cl. ..................................... 323/235; 323/287
[58] Field of Search ............... 323/268, 271, 285, 286, 323/287, 235, 319

[56] References Cited

U.S. PATENT DOCUMENTS

| | | | |
|---|---|---|---|
| 3,670,233 | 6/1972 | Zellmer et al. | 323/282 |
| 3,781,653 | 12/1973 | Marini | 323/287 X |
| 3,818,318 | 6/1974 | Schott et al. | 323/287 |
| 3,986,100 | 10/1976 | Beierholm et al. | 323/285 |
| 4,258,308 | 3/1981 | Weischedel | 323/285 |

FOREIGN PATENT DOCUMENTS 0169360  9/1984  Japan ................................. 323/282

OTHER PUBLICATIONS

R. D. Weekly, "Current Sense Resistor in Switching Regulator Snubber Network", IBM Tech. Discl. Bulletin, vol. 21, No. 10, (Mar. '79), pp. 3908–3909.

Primary Examiner—Peter S. Wong
Attorney, Agent, or Firm—Roger A. Marrs

[57] ABSTRACT

A solid state switching regulator is disclosed whereby rectified line voltage, and current is converted by the switching action of On and Off switching elements to produce a regulated voltage output with short circuit protection. The switching element or elements are switched in a manner such that they are turned off and on when no current is passing through them, thus eliminating the switching losses and the energy consuming snubbing networks normally associated with switching regulator devices.

7 Claims, 4 Drawing Figures

RESONANT SWITCHING REGULATOR

BACKGROUND OF THE INVENTION

1. Field of the Invention

The present invention relates to a power supply for the development of a regulated DC output and more particularly to a device that has very small losses and thus high operating efficiency. This highly efficient regulation is maintained over wide load variation and is capable of being shorted without damage or the excessive loss of energy.

2. Brief Description of Prior Art

The use of switching regulators for the conversion and regulation of direct current in power supply applications is become more and more universal. The primary advantage of these devices is that by switching at high speeds, regulation may be accomplished with small light weight components. This is accomplished at a considerably higher efficiency than is normally experienced with the series pass regulator where an element is inserted between the source of DC energy and the load impedence of the element is automatically adjusted to supply the appropriate output current and voltage. Such a series regulation method requires that substantial energy be dissipated in the series regulator. In the switching regulator, the switching device is either all the way on or all the way off. Thus its losses are limited to the switching losses and the on state forward voltage drop losses.

Switching losses are dependent upon the amount of current flowing through the switching element at the time it is turned off or on, as well as the amount of time it takes to do so and how often it is done. Thus it may be said the loss is directly proportional to the current at switching time and frequency. These losses are normally still substantially less than that of the series pass element. Even with the improved efficiencies, it is considered a good design if only 20% of the energy is lost in the regulating circuits. Many commercially available units lose as much as 30% of the input power in the process of transforming the power while regulating. Switching losses develop too much heat in the switching element and subject it to damage when the voltage across it and the current through it exceed a particular point at the same time. In order to increase reliability by removing the heat from the switching device, a snubbing network consisting of a resistor and a capacitor, and often a diode bypassing the resistor, is connected across the switching element to absorb the switching energy at the time the element turns off. The snubber does not do anything to increase the efficiency of the circuit it merely removes the loss from the switching device and improves its reliability. In fact, the efficiency is actually reduced by the snubber since the value of the capacitor must be selected for the worst case of operation. A 20 to 30% heat loss also normally requires that the power supply be made larger to incorporate a heat sink or radiating device. Larger power handling supplies may require air or water cooled heat sinks for the switching element snubbing network resistor.

SUMMARY OF THE INVENTION

Accordingly, the above problems and difficulties are obviated by the present invention which provides a novel resonant configuration wherein the switching element turns on into an inductive load at zero current, rises to maximum and decreases back to zero before the switching element then turns off. This eliminates the need for costly and energy consuming snubbing devices, while increasing the overall efficiency.

It is among the primary object of the invention to provide a switching regulator which operates at an efficiency of better than 90%.

It is a further object of the invention that this high efficiency be attained with a minimum of electronic components.

Yet another object of the invention is to save cost through the use of less expensive switching elements since they do not have to operate while current is passing through them.

Still another object of this invention is to provide safe operation wherein the output may be shorted without high energy dissipation or damage to its switching element.

Yet a final object of this invention is to achieve all of the above objects at a minimum cost while maintaining a high degree of reliability.

BRIEF DESCRIPTION OF THE DRAWINGS

The features of the present invention which are believed to be novel are set forth with particularity in the appended claims. The present invention both as to its organization and manner of operation together with further objects and advantages thereof may be best understood by reference to the following description taken in connection with the accompanying drawings in which:

DESCRIPTION OF THE PREFERRED EMBODIMENTS

The following detailed descriptions are of the best presently contemplated modes of carrying out the invention. This description is not to be taken in a limiting sense but is made merely for the purpose of illustrating the general principles of the invention. Since the scope of the invention is best described in the appended claims.

Figure 1:
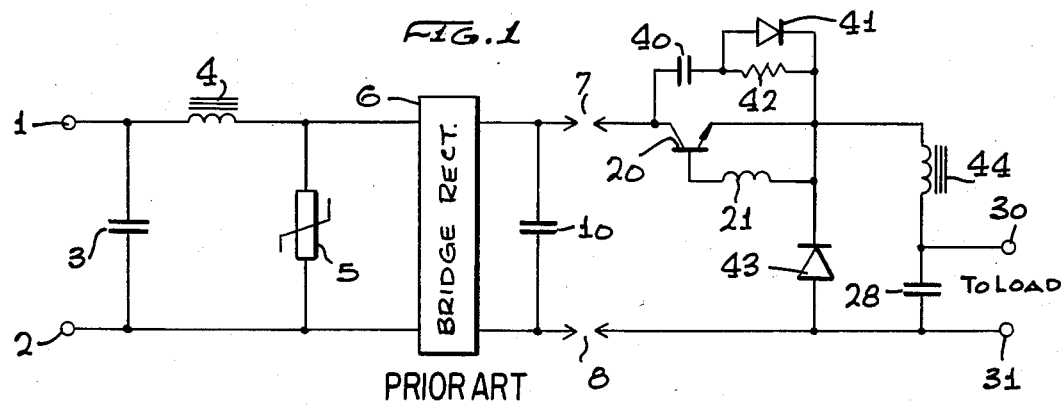
FIG. 1 is a schematic diagram representing the current state of the art method by which a switching regulator converts unregulated input power to regulated output power.

Referred to FIG. 1, the line power enters at points 1 and 2, capacitor 3 is connected to suppress line trancients as well as provide a path to ground for any conducted radiation generated by the switching regulator. Inductor 4 acts to suppress conducted radiation; and in conjunction with MOV 5 shunts any line surges or transients to common and provides further protection for balance of the circuit. The AC power is then rectified to pulsating DC by bridge rectifier 6. Capacitor 10 serves to filter DC power drawn by the switching regulator.

When transistor 20 is biased into the On condition, by the action of secondary 21 of drive transformer 15, current flows through transistor 20, inductor 44, output filter capacitor 28, and to the load connected at points 30 and 31. When the transistor 20 is turned Off, the inductive action of inductor 44 will keep the current flowing, and it therefore will be delivered through free wheeling diode 43. This means that the diode will be forward biased, and its cathode end connected to the emitter transistor 20 will be at common potential. Thus transistor 20, turns off while full current is passing through it until the voltage at the emitter is below the forward bias point of diode 43. The time it takes to do this (turn off time) is a function of the characteristics of the transistor 20. During turnoff, a great deal of power is dissipated in this transistor. Thus, the faster it turns off, the lower the power losses at switching.

All transistors are rated with a safe operating area, (SOR) wherein they may be turned on and off with only so much current flowing through them. In order to avoid the expense of using an unacceptably expensive transistor, a snubbing network is added between the collector and the emitter of transistor 20, consisting of capacitor 40, resistor 42, and diode 41. While the transistor is turning off the voltage is changing at the emitter of transistor 20. This causes the current momentarily to flow into capacitor 40 through diode 41, diverting it from the transistor so it may operate within its safe operating area. Naturally the value of capacitor 40 is determined by the speed at which the transistor will turn off and the amount of current it will be carrying at that time. Resistor 42 is supplied as a discharge path for capacitor 40 during the time transistor 20 is on, preparing it to accept the turnoff charge. This is the conventional method by which switching regulators are operated. Since capacitor 40 must be sized to accept the worst condition of the operation of transistor 20, over its temperature range and current range, switching losses are maximized by this form of snubber network, even though the losses do not occur in the transistor itself. The energy absorbed into the capacitor is dissipated in resistor 42 each time the transistor turns back on. The energy lost therefore is directly equal to: Loss = $\frac{1}{2}$ CV2 x Frequency where C equals capacitors 40 and V equals the supply voltage. Thus if we wish to optimize the size of the regulators by operating the frequency higher to reduce the size of inductor 44, we have to trade off in higher losses in the snubbing network.

Figure 2:
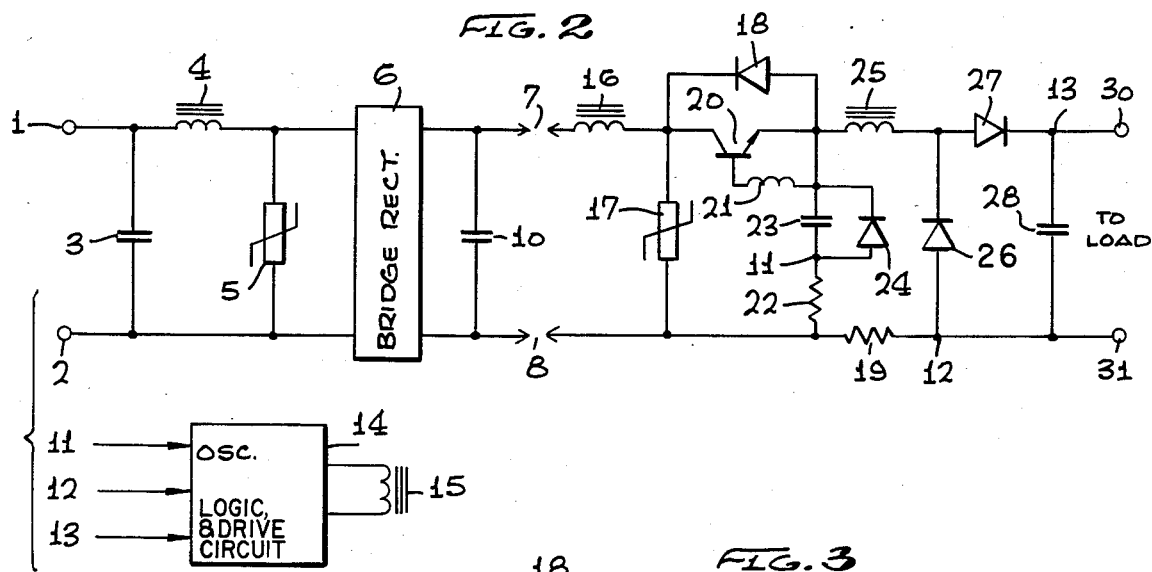
FIG. 2 is a schematic diagram of one way in which the subject concept may be implemented.

Referring now to FIG. 2, which shows a novel method by which the snubbing network may be eliminated when transistor 20 is biased into the On condition by the secondary 21 of drive transformer 15, current commences to flow through inductor 16, transistor 20, capacitor 23, and sense resistor 22 to the circuit common 8. This current will start at zero value and continue to build until the voltage across capacitor 23 has reached the DC input voltage of point 7. Up to this point, the current has been increasing. The inductive action of inductor 16 will cause the current to continue to flow but it will now decrease toward zero driving the voltage on capacitor 23 above input voltage at point 7. This voltage would normally rise to twice the input voltage, except for the loading of inductor 25, which will be discussed momentarily. When the current ceases to flow in inductor 16, the voltage on capacitor 23 now higher than the voltage at point 7 will cause current to commence to flow in the reverse direction through diode 18, and inductor 16 from capacitor 23. During this time, no current is flowing through transistor 20 and it may be turned off without switching loss.

The voltage drop across sense resistor 22 is supplied at point 11 to the logic and drive control circuit 14 and is used to determine when the current has reversed; indicating time to shut off the transistor. While the transistor was on and the voltage of capacitor 23 became greater than the voltage on output capacitor 28, current commenced to flow through inductor 25 and diode 27 into capacitor 28. This current will continue to flow even after transistor 20 is turned off until the charge on capacitor 23 is transferred to the output filter capacitor 28 and the load which is connected across it between points 30 and 31. When the voltage of capacitor 23 reaches the same as the output voltage, the inductive action of inductor 25 can continue to cause current to be drawn from capacitor 23, drawing it down until its voltage is equal to that of the circuit common 8. If at this time, energy still remains, in the core of inductor 25, further current is drawn through diode 24 until all of the energy has been transferred to the output.

Diode 26 acts as a clamp to prevent ringing of inductor 25, caused by interwinding capacity of said inductor. MOV 17 accomplishes the same task when the current in inductor 16 reaches zero prior to transistor 20 being turned back on. Resistor 19 is used to supply a sense voltage to the oscillator and control logic at point 12 to prevent transistor 20 from being turned back on until the charge transfer from capacitor 23 has completed. The voltage at point 13, also the output voltage at point 30 as referenced to circuit common 31, is also supplied to the logic control circuitry as the feedback to determine the value of the regulated output voltage. It can be seen that each time the transistor is turned a portion of energy is passed to the output. The number of times the transistor is turned on each second would determine the amount of power passed to the output. The voltage on capacitor 28 is fed back from point 13 to the logic circuit and controls the frequency of operation, and thus the output voltage.

As an additional advantage this circuit is short circuit proof. In the event that the output is shorted, operation will proceed as described until diode 24 is conducting, the voltage across inductor 25 will be only the sum of the two forward drops of diodes 24 and 27. This exceptionally low voltage will take an inordinately long amount of time to remove the energy from inductor 25 and thus prevent transistor 20 from being turned on again, as previously discussed.

Figure 3:
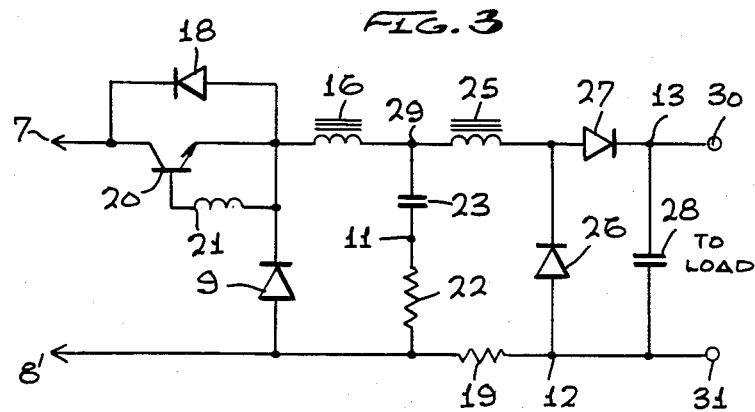
FIG. 3 is a second method of implementing the same result.

Referring to FIG. 3, it can be seen that the circuit operates almost identically as the circuit of FIG. 2, except that inductor 16 is in the emitter side of transistor 20. MOV 17 has been removed as unnecessary and diode 9 has been added to take care of any ringing that might occur in inductor 16, which might create voltage spikes that could damage transistor 20. Other than this the same description applies. Charge is passed through inductor 16 into capacitor 23 until current reverses in inductor 16 and is then conducted by diode 18 while transistor 20 shuts off. Charge is transferred in the same manner as before from capacitors 23 through inductor 25, diode 27, filter capacitor 28 and the load connected between points 30 and 31. Sensing is done in the same manner. In practice, this appears to be the more reliable of the two circuits.

Figure 4:
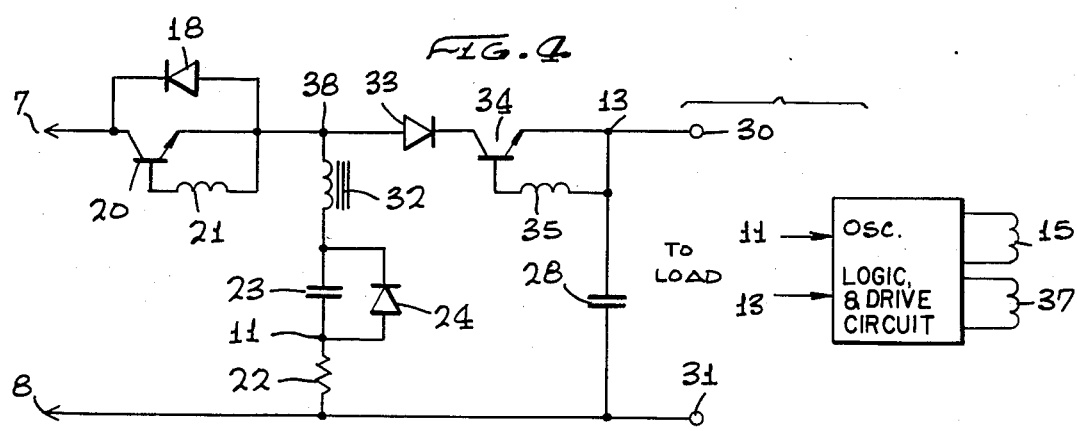
FIG. 4 is a third method of implementing the same result.

FIG. 4 uses a similar charge ladeling technique. Capacitor 23 is in the same position as is transistor 20, Inductors 16 and 25 are replaced with inductor 32 placed in series with capacitor 23. This circuit uses one less inductor but one additional transistor, and can operate slightly more efficiently than the circuits of FIG. 2 and FIG. 3. The addition of an extra active switching component, will normally increase the price.

When transistor 20 first turns on, from the action of secondary 21 of the drive transformer 15, driven by the oscillator and logic circuitry 14, current flows through the transistor, inductor 32, capacitor 23, sense resister 22, back to common 8. This action will continue until the voltage on capacitor 23 reaches the applied voltage of point 7. The voltage will then continue to rise on capacitor 23 via the inductive action of inductor 32 until it reaches twice the applied voltage. At this point, current will reverse in inductor 32 and will momentarily flow through diode 18, allowing transistor 20 to be turned off. The reverse current is sensed by a change in polarity of the voltage across sense resistor 22. Once transistor 20 has been turned off transistor 31 is turned on and since the output voltage on capacitor 28, connected to the load via points 30 and 31, is lower than the applied input voltage. This must be the care for the circuit to work.

The voltage at point 38 to the same as the output voltage except for the small forward drops of diode 33 and transistor 34. Current will no longer flow through diode 18. Current will continue to flow through transistor 34 until it has drained all of the energy from capacitor 23 and through the inductive action of inductor 32, drawing current through diode 24 until all of the stored energy in inductor 32 has been transferred to the load. At this point the current will be zero and transistor 34 will be turned off. With transistor 34 off, the voltage at point 38 will be dropped to that of the capacitor 23 which will be at or near common reference. Diode 33 serves to block current from flowing backward through the drive winding 35 of transistor 34 through the base collector junction which would be forward biased part of the cycle.

Short circuit protection is accomplished in the same manner as the circuits of FIGS. 2 and 3, in that once diode 24 is forward biased, and 34 is on, the forward voltage drop across 32 will be very, very low, thus is will take an inordinately long time to lose the last amount of its charge, preventing the circuit from turning back on for the same extended While particular embodiments of the present invention have been shown and described, it will be obvious to those skilled in the art that changes and modifications may be made without departing from this invention in its broader aspects and therefore, the aim in the appended claims is to cover all such changes and modifications as if included in the true spirit and scope of this invention.

I claim:

1. A regulated DC power supply comprising a source of DC voltage having a common terminal;
   an on and off switching element having two sides;
   a first inductor which is connected to said source of DC voltage and one side of said on and off switching element;
   a first capacitor connected to the other side of said on and off switching element and to said common terminal such as to place said first inductor, said on and off switching element and said capacitor in series across said source of DC voltage;
   a first diode connected in parallel with said on and off switching elements, polarized to conduct only in the opposite direction as said on and off switching element conducts current;
   a current sensing element further connected in series with said first inductor, said on and off switching element, said first capacitor, and said source of DC voltage;
   a second inductor, a second diode, and a second capacitor connected in series with each other, the combined series combination connected in parallel across said first capacitor, said second capacitor to perform as an output filter capacitor whereby a load may be directly connected thereacross;
   an oscillator, logic, and drive circuit connected to turn on and off said on and off switching element, said oscillator, logic and drive circuit, to accept output from said current sensing element to turn off said on and off switching element only during that part of the cycle of operation when no current is passing through said on and off switching element, and to turn on said on and off switching element only when current is no longer flowing out of said first capacitor through said second inductor as sensed by said current sensing element;
   a feedback path operably connected to said second capacitor and said oscillator, logic and drive circuit to cause the on and off switching element to turn on only when the voltage across said output filter capacitor drops below a predetermined level.

2. A power supply according to claim 1 wherein;
   said first inductor and said on and off switching element are interposed such that said on and off switching element preceeds said first inductor in the series connection of said on and off switching element, said first inductor, said first capacitor, and said current sensing element.

3. A power supply according to claim 2 wherein;
   a third diode connected between the common side of said source DC voltage and current and the junction of said on and off switching element and said first inductor, said third diode to be polarized such as to conduct current in the same direction as said on and off switching element conducts current into said first inductor.

4. A power supply as described in claim 3 wherein;
   a fourth diode connected between the common point of said source of DC voltage and current and the junction of said second inductor and said second diode polarized to conduct a current in the same direction as said second diode.

5. A power supply as described in claim 1 wherein;
   a diode is connected directly across and in parallel with said first capacitor polarized to be conductive only during that portion of the cycle when current is flowing in said second inductor.

6. A power supply as described in claim 5 wherein;
   a metal oxide varistor is connector with one end to the junction of said first inductor and said on and off switching element, the other end connected to the common terminal of said source of DC voltage.

7. A regulated DC power supply comprising;
   a source of DC voltage one side designated hot, the other side designated common;
   a first on and off switching element, an inductor, a first capacitor, a current sensing element, all connected n series in this order described, the three thusly connected series elements connected across said source of DC voltage, the current sensing element end of said series connection to be connected to the side of the source of DC voltage designated common;
   a first diode connected in parallel across said first on and off switching elements polarized to conduct current in the opposite direction from said on and off switching element;

a second diode connected in parallel directly across said first capacitor polarized to conduct current in the opposite direction from the direction current flows when said first on and off switching element is in the on conduction mode;

a third diode, a second on and off switching element, a second capacitor, all three elements connected in series in the order just described with said third diode connected to the junction of said first on and off switching element and said inductor, said third diode and said second on and off switching element to be polarized to conduct current when doing so in the same direction as said first on and off switching element;

an oscillator, logic, and drive circuit that responds to the current in the current sensings element, and alternately switches on and off the first and second on and off switching elements, such that switching takes place normally when the current passing through that particular on and off switching element is at or near zero;

a connection between said oscillator, logic and drive circuit to sense voltage across said second capacitor which causes the oscillator, logic and drive circuit to prevent the first on and off switching element from commencing conduction should the output voltage be above a predetermined level.

* * * * *